United States Patent [19]

Dege et al.

[11] 4,024,043

[45] May 17, 1977

[54] SINGLE FILM, HIGH PERFORMANCE BIPOLAR MEMBRANE

[75] Inventors: Gerald J. Dege, Parsippany; Kang-Jen Liu, Somerville, both of N.J.

[73] Assignee: Allied Chemical Corporation, Morris Township, N.J.

[22] Filed: Dec. 31, 1975

[21] Appl. No.: 645,848

[52] U.S. Cl. .............................. 204/296; 204/180 P
[51] Int. Cl.$^2$ ........................................ C25B 13/08
[58] Field of Search ....................... 204/296, 180 P

[56] References Cited

UNITED STATES PATENTS

| 3,510,418 | 5/1970 | Mizutani et al. | 204/181 |
| 3,562,139 | 2/1971 | Leitz | 204/296 |
| 3,657,104 | 4/1972 | Hodgdon | 204/301 |
| 3,868,314 | 2/1975 | Mizutani et al. | 204/296 |

FOREIGN PATENTS OR APPLICATIONS

| 2,427,431 | 12/1974 | Germany | 204/296 |
| 2,504,622 | 8/1975 | Germany | 204/296 |

*Primary Examiner*—F.C. Edmundson

*Attorney, Agent, or Firm*—Arthur J. Plantamura; Ernest A. Polin

[57] ABSTRACT

Novel single film bipolar membranes, of substantially improved efficiency and durability, i.e. having an ion selectivity above 80% in an electrolyte medium of about one mole, are prepared from pre-swollen films containing a relatively high amount, i.e. at least 15% of an insoluble cross-linked aromatic polymer. Under controlled conditions, high dissociable cationic-exchange groups are chemically bonded to the aromatic nuclei to a desired depth of the film from one side only; subsequently, highly dissociable anion-exchange groups are chemically bonded to the unreacted aromatic nuclei on the other side of the film. The functionalized, densely structured single film ion exchange membrane undergoes negligible degradation, is blister free, and is uniquely suited for electrodialysis particularly water-splitting operations due to its low electrical resistance and low salt leakage. The membrane operates with improved current efficiencies at both high electrolyte concentrations and high current densities, for time periods not previously achievable.

11 Claims, 3 Drawing Figures

SINGLE FILM, HIGH PERFORMANCE BIPOLAR MEMBRANE

BACKGROUND OF THE INVENTION

The present invention is directed to a class of bipolar membranes possessing both low electrical resistance and superior performance properties and durability. In particular, the invention relates to single film bipolar membranes comprising an organic polymer matrix intimately containing a substantial amount of a cross-linked aromatic polymer, and having highly dissociable functional groups of opposite electrical charges, chemically bonded to the aromatic nuclei on opposite sides of the film. More specifically, the invention relates to the compositions of such structures and to the methods for preparing them.

Various ion exchange membranes, cationic and anionic, individually as well as laminae membranes, are well known in the art. Styrene-divinylbenzene copolymers with sulfonic acid ion exchange groups (cation-type) are fully disclosed, e.g. in U.S. Pat. No. 2,731,411. The anion-type, for example a styrene-divinylbenzene vinylpyridine membrane, is disclosed in U.S. Pat. No. 2,860,097. Cation and anion membranes based on polyethylene-styrene copolymers bonded together in a hydraulic press under heat and pressure to form two-ply membrane structures are also known as shown, for example in U.S. Pat. No. 3,372,101. Such membranes generally have the disadvantage of high electrical resistance, incurred during fusion; are prone to bubble or blister; and only operate at relatively low current densities, for short time periods, all of which render them unattractive for commercial electrodialysis operations.

Some single film bipolar membranes have also been disclosed. For example, some have been obtained by hydrolyzing one side and aminating the other side of a chlorosulfonated polyethylene sheet, as disclosed in U.S. Pat. No. 3,388,080. Membranes thus prepared, however, are relatively inefficient in that they have high voltage drops across them due to their relatively low ion exchange capacity. Another single film bipolar membrane, of the polyethylene-styrene divinylbenzene type, is disclosed in the Leitz U.S. Pat. No. 3,562,139. The latter membranes are designed specifically for desalination by electrodialysis, wherein, the direction of electrical current flow is periodically reversed. Such membranes behave asymmetrically transferring mainly cations when the cationic lamina of the membrane faces the cathode and transferring mainly anions when the anionic lamina faces the cathode. To the degree that any water splitting could be effected using the membrane described by Leitz in U.S. Pat. No. 3,562,139, the current efficiency of the contemplated desalination process would be decreased. Moreover, the membranes of U.S. Pat. No. 3,562,139 have only a relatively low level of cross-linking (approximately 0.5% active divinylbenzene) which results in relatively inferior ion selectivity. Also membranes of the kind disclosed in U.S. Pat. No. 3,562,139 possess design features, such as (a) a cation exchange group internal molality less than the anion exchange group internal molality, and (b) an anionic layer which is thinner than the cation layer, both of which aid the transport of the electrolyte through forbidden areas, i.e., against the Donnan exclusion forces, and possess only relatively low current efficiencies (50–70% desalination) at low electrolyte concentrations (.03–.06N) and current densities (8–25 amp/ft$^2$).

Thus, while the preparation of low cross-linked, low ion-selective polyethylene-polystyrene bipolar membranes has been achieved, it is particularly difficult to obtain bipolar membranes with a relatively high number of cross-linking bonds, high functional group concentrations, high ion-selectivities, and yet have low membrane voltage drops and long operational capabilities at relatively high current densities and electrolyte concentrations. This invention discloses methods for obtaining single film bipolar membranes with these advantages.

SUMMARY OF THE INVENTION

The primary object of this invention is to prepare single film bipolar membranes which comprise a matrix of a polymeric film in intimate dispersed relationship with a relatively high amount of an aromatic polymer, which is suitably crosslinked such as with a di- or polyfunctional compound. Highly dissociable cation exchange groups are chemically bonded to the aromatic nuclei from one side of the film, while highly dissociable anion exchange groups are subsequently chemically bonded to the remaining aromatic nuclei on the opposite side. The membrane so composed functions particularly advantageously as a durable water-splitting membrane to generate acid and base from dissolved salts by electrodialysis with substantially improved efficiency at both high electrolyte concentrations, i.e. several molar and current densities, such as 100–400 amp./ft.$^2$ or above.

Another object is to prepare more densely structured membranes, wherein counter-ion transport in opposition to Donnan exclusion forces is greatly decreased, but nevertheless does permit sufficient hydraulic permeability to prevent the membrane from dehydrating.

A further object is to prepare highly cross-linked membranes which are less prone to blister, are substantially less porous, and permit only low salt diffusion across them.

Another object is to prepare bipolar membranes having ion exchange capacities between about 1–6 meq/g of dry membrane, with cation-exchange groups and anion-exchange groups of about equal concentration, and which have very low potential drops across the membrane.

Still another object of the invention is to prepare membranes which are less brittle, have little or no degradation, have excellent strength and durability, and which are stable under conditions and for time periods not previously attainable.

Additional objects will become apparent from the disclosure which follows.

The single film bipolar membrane compositions of the present invention are prepared from a single polymeric film, such as, polyethylene, polypropylene, etc., as a matrix and intimately contains at least 15% by weight, based on the total weight of dry membrane, of an aromatic nuclei containing polymer, such as polystyrene, poly-α-methylstyrene, etc., which is suitably cross-linked with a di- or poly-functional crosslinking agent, such as, divinylbenzene or its equivalent. Subsequently, highly dissociated cation exchange groups, e.g. sulfonic acid, are chemically bonded to about 50 to 98 percent of the aromatic nuclei from one side of the film only, and later highly dissociated anion exchange groups, e.g. quaternary ammonium groups are chemically bonded to the remaining, i.e., 2 to 50 percent, aromatic nuclei. Performance characteristics of the final membrane depend greatly on the relative amounts of matrix film, aromatic polymer, and cross-linking agent used in their fabrication. Disclosed herein are the conditions and procedures used to obtain compositions which not only have improved performances as water-splitters during electrodialysis, but also possess excellent strength and durability.

DETAILED DESCRIPTION OF THE INVENTION

Figure 1:
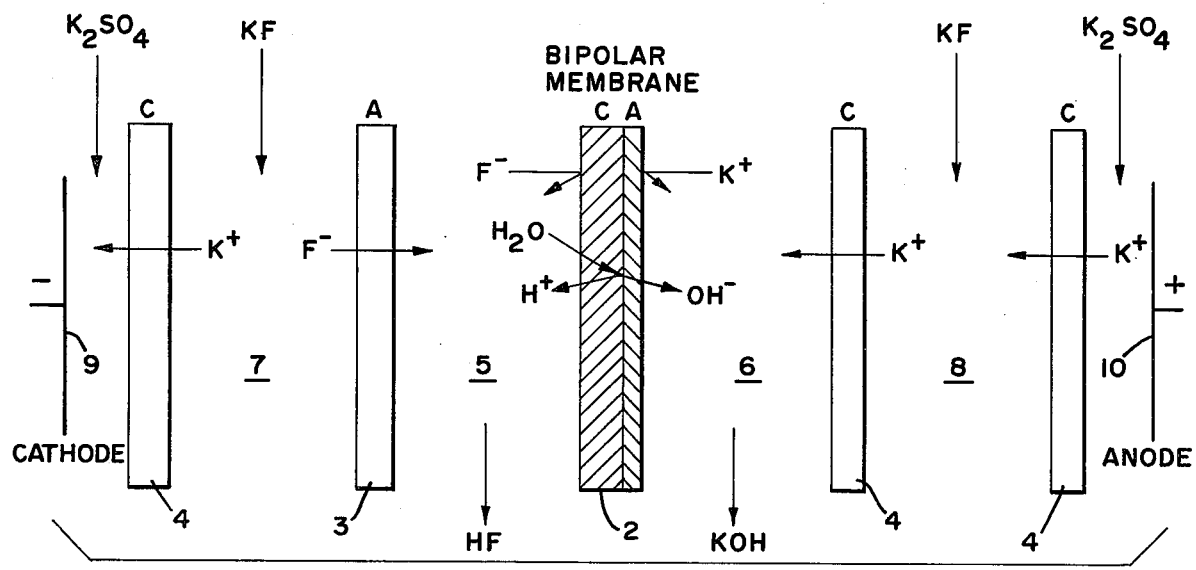
FIG. 1 is a magnified illustration of a cross-section of a single film bipolar membrane positioned schematically in a typical electrodialysis cell in combination with conventional "single" charge anion and cation permeable ion exchange membranes.

In FIG. 1 of the drawing a typical arrangement utilizing the bipolar membrane prepared in accordance with the invention is illustrated. As shown, a bipolar membrane 2 is depicted schematically as a water-splitter in an electrodialysis cell. Acid and base flow through compartments on opposite sides 5 and 6 of the bipolar membrane 2, which are also bounded by anion permeable and cation permeable ion exchange membranes 3 and 4, respectively. Salt solution, KF, passes through the adjacent compartments 7 and 8 which are separated from the electrode compartments 9 and 10, containing $K_2SO_4$ solution, by additional cation exchange membranes 4. Under the influence of a direct electric current, anions ($F^-$) and cations ($K^+$) within the bipolar membrane migrate out of the membrane toward the anode and cathode, respectively, and in the vicinity of the interface their concentrations rapidly decline. At this point continued passage of the electric current can only occur by the transfer of $OH^+$ and $H^+$ ions produced by the dissociation of water ("water-splitting") at the interface. Naturally, the membranes must be sufficiently water permeable in order to replace water molecules consumed by the reaction; otherwise the membrane will "burn-out". Current efficiencies for the production of acid and base using membranes of the invention varied from 79-92% and 66-82% respectively, at a current of 163 ma/cm$^2$ (150 amp/ft$^2$) and electrolyte concentration of about 9-11% acid and base. These are higher ranges than have been normal in the prior art, e.g. 24 amp/ft$^2$ and 0.1N solutions or less. In addition, in the use of membranes of the invention only negligible amounts of salt, KF, were found in the acid, indicating very low diffusion of base through the membrane.

Figure 3:
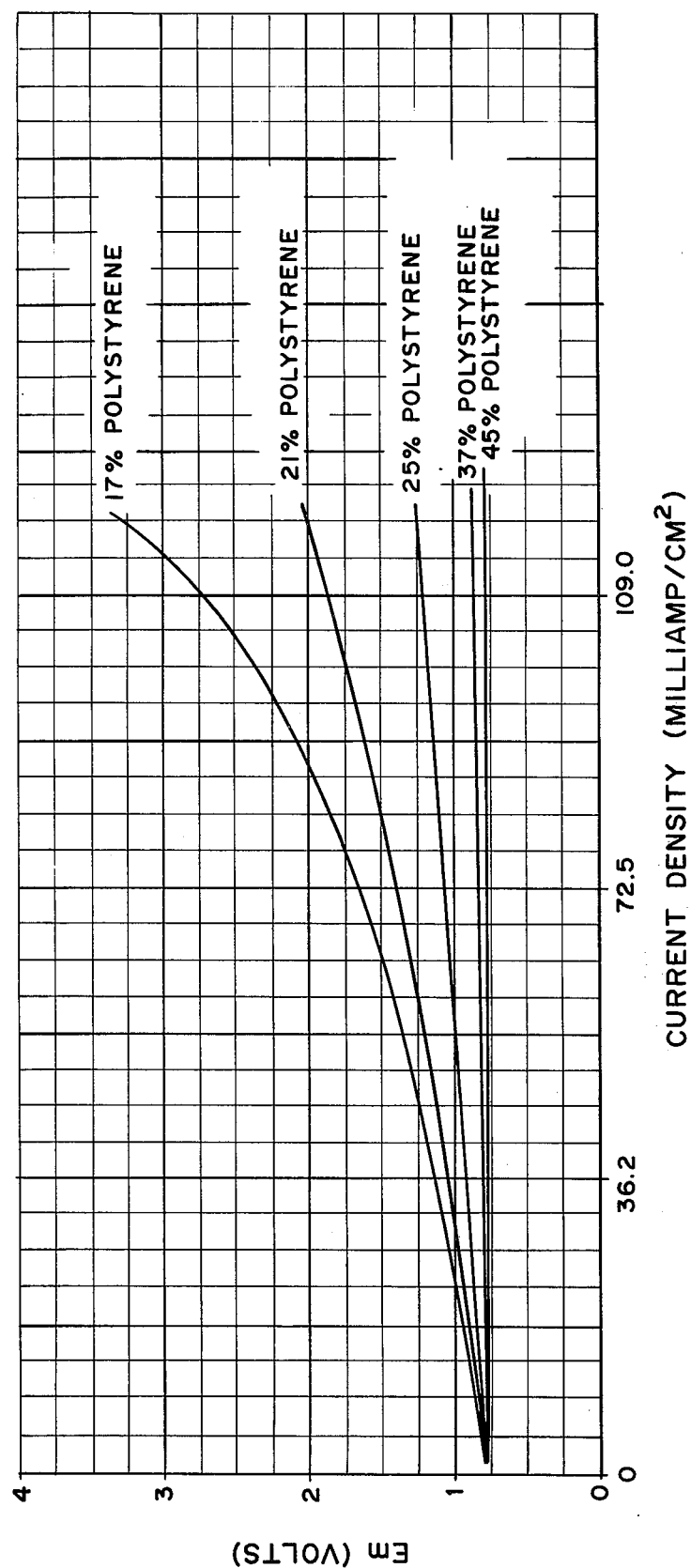
FIG. 3 shows the potential drop, Em, as a function of current density for an illustrative single film bipolar membrane with various polystyrene contents (i.e. ion exchange capacity) prepared according to the invention.

Uniformly impregnated sheets with wide ranges in both their aromatic polymer content and cross-linking content, which subsequently functionalize homogeneously to low resistance membranes, were prepared and compared. Films with low cross-linking contents, i.e. about 2% DVB in the styrenating mixture, were found to blister easily. Those with polystyrene contents of about 23% had potential drops which depended greatly on the relative thicknesses of the two layers. Potentials approached 1 volt (at 100 amp./ft$^2$) only as the cationic layer became about 90% of the films' thickness. Increasing the cross-linking content of the films was found to eliminate blistering and styrenation mixtures containing 5-15% DVB were of common use. At these higher cross-linking contents, however, potential drops became even more sensitive to the relative thickness of the oppositely charged layers and it was difficult to obtain membranes of 1 volt (at 100 amp./ft.$^2$) regardless of the thickness of its cation permeable layer. This is depicted in FIG. 3. When the ion exchange capacity is increased by increasing the vinyl aromatic, e.g. the polystyrene content to 35 -50%, potentials less than 1 volt are realized. In addition, the potentials are less sensitive to the relative thicknesses of the layers and at 43% styrene, for example, potentials of 1 volt and less are obtained with membranes having 54% or more cation exchange layer as seen by reference to Table I and FIG. 3.

Prior to the functionalization of the cross-linked film of the present invention, the film is advantageously preswollen in a solvent such as carbon tetrachloride, dichloroethane, etc., for a period of time sufficient to render the aromatic nuclei readily accessible to the reagent. The swelling solvent must be inert to the reagent but miscible with it or its mixture. As will be noted hereafter, and by way of examples, preswelling permits the reaction to proceed under milder, more controlled conditions, with no significant degradation or embrittlement of the film. Both the sulfonation and subsequent chloromethylation and amination are properly controlled and occur extensively at the para-position, yielding relatively high and about equal concentrations of both ion exchange groups which minimizes salt leakage, due to Donnan exclusion forces. Since only very low amounts of salt, KF, are found in the acid, HF, negligible base diffusion through the membrane is indicated. Also, the durability is attested to by the fact that some of the membranes have run continuously in electrodialysis cells for over a year at 71-83 amp/ft$^2$ with no lessening in performance and only modest increases in potentials.

The bipolar membranes of the present invention are prepared from single sheets of aromatic nuclei containing cross-linked, polymeric films. The sheets are preswollen prior to appending the cation exchange groups from one side, followed by appending anion-exchange groups to the opposite side.

The resulting membranes possess lower resistances which allow the use of higher current densities (100-150 amp./ft$^2$ or above) and electrolyte concentrations and exhibit higher current efficiencies. The membranes are particularly suited for industrial water-splitting applications in which high performance is a prerequisite.

The matrix film employed in preparing the bipolar membrane of the present invention may comprise any of the polymers derived from monomers selected from the group consisting of

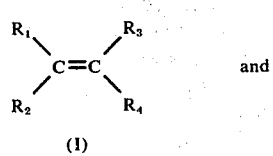 and 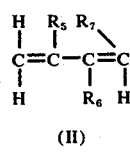

(I)    (II)

wherein $R_1$ to $R_7$ are substituents selected from the group consisting of hydrogen, chlorine, fluorine, alkyl radicals of 1 to 5 carbon atoms and phenyl radicals and copolymers thereof, and chlorinated and fluorinated polymers and copolymers thereof. Typical of polymers derived from the formulae (I) and (II) are polyethylene, polypropylene, polybutene-1, poly-3-methyl-1-butene, poly-4-methyl-1-pentene, poly-4-methyl-1-hexene, polyvinyl chloride, polyvinyl fluoride, polystyrene, polyvinylidene chloride, polyvinylidene fluoride, polyisobutylene, polytrifluorochloroethylene, polytetrafloroethylene, polybutadiene, polyisoprene, polychloroprene, poly-2,3-dichlorobutadiene, poly-1,3-pentadiene, and the like and copolymers thereof, and chlorinated and fluorinated polymers and copolymers thereof.

Films of various densities, such as low density, high density, or ultra-high molecular weight polyethylene may be used, but it is important that the film have a homogeneous rheological structure in order to obtain uniform membranes. To afford active sites the film is impregnated with a mixture of an aromatic nuclei containing monomer and a suitable cross-linking agent or in lieu of a chemical cross-linking agent subjected to well known cross-linking conditions. Prior to polymerization all of the excess liquid polymerizate should be removed from the film's surface in order to ensure subsequent uniform functionalization.

The aromatic monomers which are intimately dispersed and polymerized on the matrix film composed of the monomeric compounds of the above formulae (I) and (II) are those of the formula

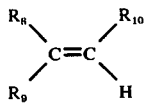

$$\begin{matrix} R_8 & & R_{10} \\ & C=C & \\ R_9 & & H \end{matrix} \quad (III)$$

wherein $R_8$, $R_9$ and $R_{10}$ are substituents selected from the group consisting of hydrogen, alkyl radicals of 1 to 4 carbon atoms, phenyl substituted alkyl radicals of 2–4 carbon atoms, phenyl, phenoxy-, thiophenoxy, and naphthyl radicals and the hydroxyl-, alkoxyl-, and halo-substituted phenyl, phenoxy, thiophenoxy, and naphthyl radicals and mixtures thereof and wherein at least one substituent is an aromatic radical. Illustrative of such compounds are styrene or its nuclear and/or alpha substituted derivatives, such as α-methyl styrene, α-ethyl styrene, α,β-dimethyl styrene, 4-phenyl-butene-1, α-chloro-styrene, α-bromostyrene, 2-chloro-styrene, 2-bromostyrene, 2-fluorostyrene, 2-hydroxy-styrene, 2-methoxy-styrene, vinyl naphthalene, vinyl phenylethers, and vinyl phenyl sulfides. The weight ratio of the matrix film and the aromatic component should be adjusted so as to ensure an ion exchange capacity of the final membrane of about 1.4–6.0 meq/g. In the case of styrene from about 15 to 70% of the impregnated film should preferably be cross-linked polystyrene.

The aromatic polymer on the substrate is cross-linked sufficiently to prevent substantial dissolution or swelling of the membrane when it is immersed in solvents in which the membrane is to be primarily used, e.g. aqueous acid and base solutions. Cross-linking methods which may be used include any of the well known mechanisms, such as chemical or radiation, either singly or in combination; illustrative of cross-linking systems are the use of polyvinyl compounds, such as divinylbenzene, and substituted derivatives thereof, such as nuclear and/or alpha-substituted derivatives, e.g., divinyl toluene, α, α′-dimethyl divinylbenzene, α, α′-dimethyl divinyltoluene, divinylnaphthalene, divinylxylene, divinylethylbenzene, divinylchlorobenzene, trivinylnaphthalene, divinylphenylether, divinylsulfone, divinylacetylene, and also radiation, such as electron beam. Preferably a cross-linking agent such as divinylbenzene (DVB) may be used. DVB is available commercially as a mixture containing 55% divinylbenzene isomers and about 45% ethyl vinylbenzene as the main components. The mole ratio of the aromatic compound to the cross-linking agent can vary from about 112:1 to 9:1, corresponding to about 2–20% commercial divinylbenzene in the styrene mixture.

Preswelling of the cross-linked film prior to the sulfonation reaction, may be effected by the use of any suitable solvent which is inert to but miscible with the sulfonation agent or mixture. Suitable solvents are carbon tetrachloride, chloroform, methylene chloride, 1,2-dichloroethane, 1,1,2-trichloroethane, 1,1,2,2-tetrachloroethane, dimethyl acetamide, dimethylformamide, decalin, tetralin, and cyclohexane.

A preferred membrane in the present invention is that prepared from the polyethylene-polystyrene-divinylbenzene system; utilized as a typical composition in describing the preparation of membranes according to the invention.

EXAMPLES 1–21

General Procedure

In preparing the membrane the initial polyethylene film was first examined between crossed polaroid sheets for non-uniformities, such as gels, strains, disorientations or the like. The uniformity of the film's thickness was measured with a micrometer. The films were supported in stainless steel troughs containing the aromatic vinyl monomer mixture of the selected mole ratio of vinyl aromatic monomer and cross-linking agent, e.g. styrene/divinylbenzene/benzoyl peroxide (initiator), and at the desired temperature. Immersion in the vinyl aromatic monomer, e.g., styrenation is conducted for a time period necessary to attain sufficient impregnation of the film, which is dependent upon its thickness and morphology, as well as, the styrenating temperature.

In impregnating the substrate film with the vinyl aromatic monomer, temperatures at or above which the film softens to an undesirable degree are to be avoided. Generally for mixtures containing 5–15% DVB, styrenations were carried out at 70°–94° C. for time periods of about 10 minutes to 1 hour. Following styrenation, the film is removed from the bath, excess styrene removed from its surface, and it is then pressed between aluminum foil covered glass plates and polymerized at 70–85° C for 18–24 hours. In order to obtain styrene contents of about 40–60% the procedure may be repeated. After each polymerization, surface polystyrene is easily removed with a suitable solvent, e.g. $CCl_4$, dichloroethane, etc., if required.

Prior to sulfonation, the cross-linked film is preswollen in a solvent, inert to, but at least partially miscible with the sulfonating agent or mixture for about 24 hours. The solvent swells the film, making the aromatic nuclei more accessible for reaction, hence, the reaction rate is increased and the sulfonation will proceed faster and under milder conditions. The films suffer no apparent degradation, and yield membranes which are not embrittled and display much enhanced stability and durability. Chlorosulfonations may be run at room temperature with chlorosulfonic acid-solvent mixtures ranging from 10–100% chlorosulfonic acid.

The reaction is started on one side of the film only and its progress through the film toward the opposite side is controlled and may be followed by microscopic examination of stained (methylene blue), microtomed, cross-sections. The interface betweem the reacted and unreacted layers is linear, parallel to the sides of the film, and very sharp, attributed to both the homogeniety of the film and that the reaction is apparently diffusion-controlled. Extensive chlorosulfonation and chloromethylation plus quaternization may be observed by both chemical analysis and microscopic examination and indicates the concentrations of both functional groups in the final membrane are nearly equal.

In addition, it is observed from resistance measurements (1 kc, AC bridge) of sections removed at various time intervals, that the resistance is relatively high, ranging from 1000 to 10,000 ohm-cm$^2$. due to the remaining unfunctionalized layer, until just before the reaction reaches the opposite side, at which point it suddenly falls to very low values, indicating the membrane is becoming wholly cation permeable as determined by microscopic examination of stained thin sections. It is apparent that one skilled in the art may use any fraction of this time interval to locate the interface at any desirable position across the film's thickness.

Once the partially chlorosulfonated film is hydrolyzed with dilute (1N) sulfuric acid, neutralized with a 0.1N KOH and 5% KCl mixture, rinsed free of excess electrolyte with distilled water, and dried, it is then ready for chloromethylation. In lieu of drying, the film may be treated with several portions of solvent, such as carbon tetrachloride. The chloromethylation is conducted by immersing the films into chloromethylmethylether containing 2.5% by weight, SnCl$_4$, and refluxing (59° C.) for about 6 hours under nitrogen. The film is then removed and quaternized in a 25% solution of trimethylamine in acetone at 25° C. for about 20 hours. The single film bipolar membrane so obtained is equilibrated in 1N potassium fluoride at 25° C. for 48 hours, with stirring. Microtomed thin sections may be stained with either a cationic dye (methylene blue) and/or an anionic dye (methyl orange), and have been observed to compliment each other, with a sharp interface between them.

Sulfonations may also be accomplished by means of such known reagents as (a) sulfuric acid, (b) sulfur trioxide, or (c) oleum, or (d) mixtures thereof. Chloromethylation may also be conducted by the following reagents (a) SO$_2$Cl$_2$ with methylal and a Friedel-Crafts catalyst or (b) formaldehyde and hydrochloric acid.

Electrical sensitivity - The voltage drop across the bipolar membrane is determined in a six-cell electrodialysis cell, FIG. 1, containing platinum electrodes in each end compartment, across which a direct current may be applied from a D.C. power source, (e.g. Hewlitt-Packard Model No. 6289A). The bipolar membrane is mounted between the two center cells with its anion permeable side contacted with a 1N KOH electrolyte solution and facing the anode and its cation permeable side contacted with 1N HCl solution and facing the cathode. 1N KCl is used in the two adjacent cells, with 5%, K$_2$SO$_4$ in the two end electrode compartments. Two Luggin tips (saturated KCl in agar-agar) are positioned in the center of the two middle cells, about 2 mm from the opposite faces of the bipolar membrane. The other ends of the Luggin tips are immersed in saturated KCl solutions containing two Calomel electrodes which are connected to a voltmeter. The voltage drop across the 1N HCl and 1N KOH solutions between the Luggin tips was determined in separate measurements, averaged, and subtracted from the voltage drop measured with the bipolar membrane in position. The voltage drop across the bipolar membrane was measured at various current dentisites, e.g. 1.8–165 ma/cm$^2$ (1.7–154 A/ft$^2$) and the results plotted. Since about 0.75 volts are required to split water, voltages in excess of this value are due to the resistance of the bipolar membrane itself. In addition, at no current flow the voltage drop, Eo, across the bipolar membrane is generally about 0.75–0.80 volts, but as the anionic layer gets thinner, e.g. less than about 0.5 mils in a 10 ml film, and as the interface approaches the opposite surface, as observed by microscopic examinations of stained thin sections the Eo rapidly falls below this value to about zero, which is the Eo for a wholly cationic membrane.

Bipolar membranes having a total styrene content about 15% or higher with relatively low cross-linking, for example a membrane with 2% or less of a commercial cross-linking agent, such as divinylbenzene, in the initial styrenation mixture, are prone to have blisters form on their surfaces. The size and number of such blisters vary over a wide range and are believed to be due to strains or ruptures below the surface of the relatively loose (i.e. low cross-linked) structures. Although with such low cross-linking, some smaller, blister-free specimens may be obtainable by selective sampling for evaluation purposes, the fabrication of large, blister-free sheets appears unlikely.

In accordance with the invention, blister-free membranes are obtained by providing a polymeric film with substantially increased cross-linking. Increasing the cross-linking content also tightens the structure, adding dimensional stability and decreasing its porosity. As will be apparent from the examples provided hereafter, data for Examples 1–21 being summarized in Table I, membranes prepared from styrene mixtures containing about 7.5% or higher concentration of divinyl benzene, in addition to having higher current efficiencies, had only trace amounts of salt (e.g. KF) in the acid.

When using a styrenation mixture with divinylbenzene in amounts from about 10% to about 15%, or higher, the styrene content of the membrane preferably should be at least 25% (by weight) or more, otherwise the curves obtained by plotting their potential drops against current density as shown in FIG. 3 will bend upward especially at the higher current values. This consequence is due to the fact that these structures offer more resistance to the increased flow of electrolyte, which may be adjusted by increasing the ion exchange capacity, i.e., the polystyrene content, of the membrane. For example, a bipolar membrane made from 9 mil HDPE film, containing 23% polystyrene with 2% divinylbenzene, has a potential drop ranging from 3.41 to 1.07 volts, at current densities of 109 ma/cm$^2$, depending upon the chlorosulfonation time, i.e. the relative thickness of the cationic layer (see Examples 1 to 5 in Table I). The last column shows Sample 5 was 88% cationic by microscopic examination of stained, thin sections, and apparently a voltage drop of about 1.1 volts is the best one may expect to obtain with membranes of this composition. In addition, as noted hereinabove, these membranes blister relatively easily. Bipolar membrane made from 10 mil ultra-high molecular weight polyethylene (UHMW-PE) containing 25% polystyrene, but with 15% DVB (Examples 6–9, Table I) show a similar dependence of the potential drop upon the relative thickness of the cationic layer. In both cases, as the cationic layer approaches and begins to appear on the opposite surface, the membrane begins to lose bipolarity as indicated by the rapid decrease of its Eo value, until it is nearly zero, at which point the membrane is completely cationic.

When the polystyrene content is increased to 37% (Examples 9–14), potential drops as low as 0.86 volts at current densities of 109 ma/cm$^2$ are obtained with membranes which are 94% cationic. The former values are very close to the theoretical limiting value of a water-splitter. With these higher polystyrenated membranes it is seen that their potential drops are becoming less sensitive to the relative thickness of the cationic layer. This trend is even more evident in the final series (Examples 15–21), where the films contain 43% polystyrene. Here it is seen that potential drops ranging from 1.03–0.86 volts are obtained with membranes whose cationic layer varies from 54% to about 90%. This is clearly an advantage if one is considering the fabrication of such films.

i.e. by diffusion of base through the membrane. Two of the membranes, examples 22 and 25, ran continuously for over one year, with no loss in their performance characteristics, and only modest increases in their voltage drops. The examples, therefore, serve not only to illustrate the substantial improvement in membrane performance, but also, their superior stability and durability over a wider range of operating conditions and for longer time periods than previously demonstrated attainable. It must be understood that such examples and previous descriptions are not intended as a limitation upon the scope of the invention.

EXAMPLE 22

A styrenation mixture consisting of 2 parts commercial divinyl benzene and 98 parts of freshly distilled styrene was heated in a beaker, with stirring, to 80° C. To this mixture was then added 0.5 parts benzoyl peroxide as catalyst. After mixing for one minute, the mixture was poured into a 9 × 14 × 1-¼ inch stainless steel trough, immersed in a 80° C. constant temperature water bath. Immediately thereupon, a 7 × 23 inches sheet of high density polyethylene film, 0.009 inch thick, folded in half, was immersed into the styrenating mixture and supported by two stainless steel rods. The film was impregnated with the mixture for

TABLE I

POTENTIAL DROPS FOR SINGLE FILM BIPOLAR MEMBRANES WITH VARIED POLYSTYRENE CONTENTS

| EX. NO. | INITIAL FILM | COMPOSITION % POLYSTY. | % DVB* | **'ClSO$_3$H (min.) | Eo | Em (volts) 1.8 ma/cm$^2$ | 109 ma/cm$^2$ | % CATIONIC LAYER (MICROSCOPIC) |
|---|---|---|---|---|---|---|---|---|
| 1 | 9 mil | 23 | 2 | 30 | .79 | 0.83 | 3.41 | |
| 2 | HDPE | | | 60 | .79 | 0.79 | 2.23 | |
| 3 | | | | 90 | .81 | 0.79 | 1.25 | |
| 4 | | | | 180 | 0.78 | 0.75 | 1.10 | 73 |
| 5 | | | | 240 | 0.81 | 0.78 | 1.07 | 88 |
| 6 | 10 mil | 25 | 15 | 120 | .80 | 0.88 | 4.86 | |
| 7 | UHMW-PE | | | 165 | .81 | 0.81 | 1.38 | |
| 8 | | | | 210 | .79 | 0.79 | 1.23 | |
| 9 | 9 mil | 37 | 15 | 180 | .78 | 0.76 | 1.80 | 48 |
| 10 | UHMW-PE | | | 210 | .78 | 0.75 | 1.26 | 64 |
| 11 | | | | 240 | .79 | 0.77 | 1.43 | 66 |
| 12 | | | | 270 | .79 | 0.76 | 1.03 | 81 |
| 13 | | | | 300 | .79 | 0.75 | 1.03 | 81 |
| 14 | | | | 330 | .79 | 0.75 | 0.86 | 94 |
| 15 | 9 mil | 43 | 7.5 | 100 | .70 | 3.80 | 36 ma/cm$^2$ | 33 |
| 16 | UHMW-PE | | | 220 | .78 | 0.75 | 1.03 | 54 |
| 17 | | | | 240 | .78 | 0.74 | 1.00 | 56 |
| 18 | | | | 260 | .78 | 0.75 | 0.88 | 77 |
| 19 | | | | 280 | .78 | 0.74 | 0.90 | 86 |
| 20 | | | | 300 | .78 | 0.76 | 0.87 | 74 |
| 21 | | | | 320 | .78 | 0.75 | 0.86 | 79 |

*weight percent commercial (55%) divinylbenzene in the styrenation mixture.
**chlorosulfonation time, minutes
HDPE —high density polyethylene
UHMW-PE = ultrahigh molecular weight polyethylene Examples 22 to 28, summarized in Table II further illustrate the invention. It is evident that membranes prepared in accordance with the invention herein described exhibit significantly higher current efficiencies, while operating at both higher current densities and higher electrolyte concentrations, than heretofore previously disclosed. The initial films were styrenated with mixtures containing from 2–15% commercial divinylbenzene and the final sheets contained from 23–46% polystyrene. They had potential drops of about 1 volt or less at current densities as high as 163 ma/cm$^2$ (152 amp/ft$^2$), and electrolyte concentrations of 9–11.5% acid and base, were found to produce base and acid at current efficiencies (%N$_B$, %N$_A$) from 66–82% and 79–92%, respectively. In addition, as further evidence of the tightness of these structures, only negligible amounts of salt, KF, was found in the acid, HF (%N$_{SA}$)

one-half hour before removing from the trough, wiping off the excess surface styrene with a squeegee, and then clamping between three aluminum foil covered 8 × 12 × 1/8 inch glass plates. The ensemble was then immersed into a saturated sodium sulfate salt solution at 70° C. and left to polymerize for 18 hours. The styrenated sheet was then removed, rinsed with distilled water for 3 hours at 40°–50° C, and dried overnight in a vacuum oven at 45° C over P$_2$O$_5$. The final dried, polystyrenated sheet was found to contain 22.7 weight percent polystyrene. The styrenated sheet was swollen for one day in carbon tetrachloride, free polystyrene wiped from its surface with dichloroethane and 7 × 11 inch sections were cut from it.

Figure 2:
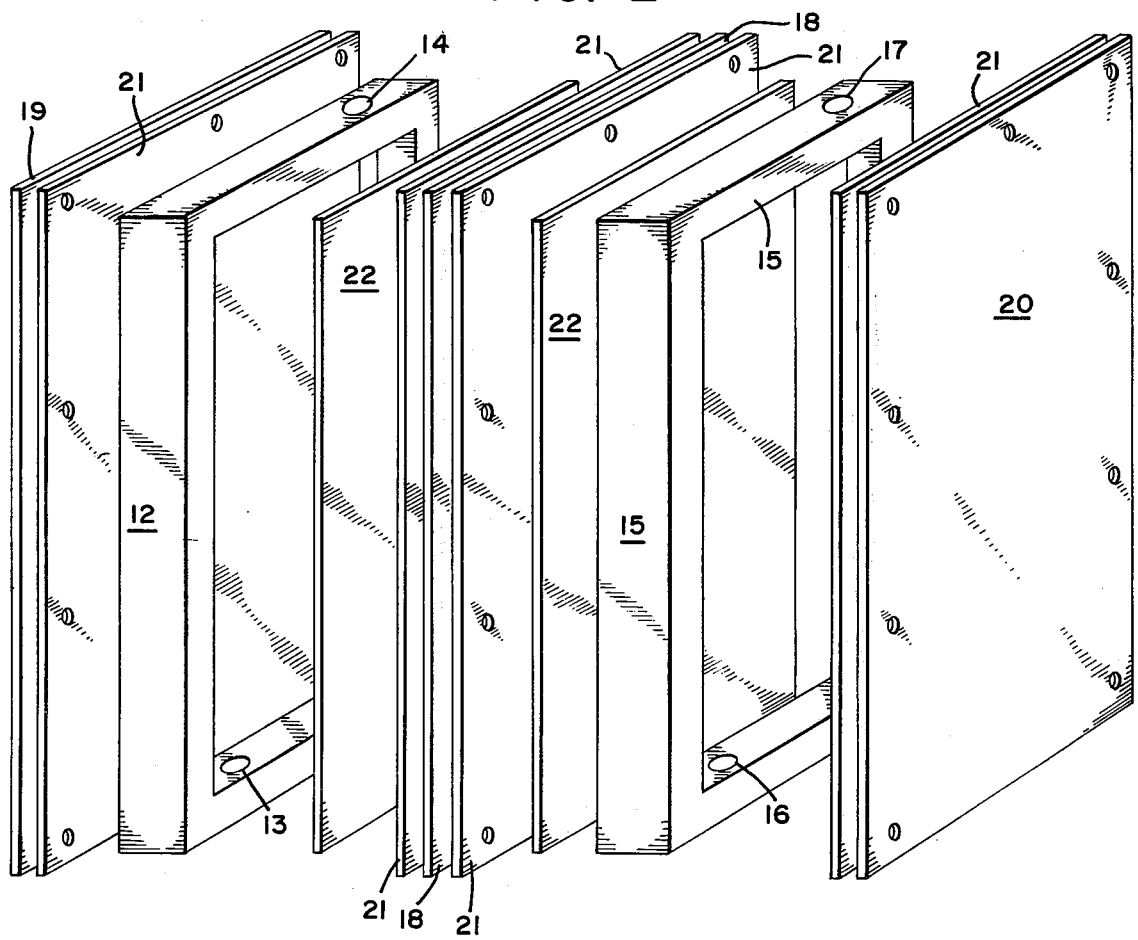
FIG. 2 depicts a chlorosulfonation apparatus which may be used to functionalize the styrenated polyethylene film from one side only in preparing the bipolar membrane of the invention.

Sections prepared as above were functionalized by supporting them in a two cell arrangement as shown by reference to FIG. 2. The arrangement of FIG. 2 comprises relatively thick brackets 12 and 15 formed of polytetrafluoroethylene containing inlet and outlet ports 13 and 16 and 14 and 17 respectively. Central and outer stainless steel plates 18, 19 and 20 respectively are provided and a polytetrafluoroethylene liner 21 is positioned on the inner sides of each of the outer plates 19 and 20 and on both sides of the central plate 18. The styrenated polyethylene film 22 is secured between the brackets and one of the polytetrafluoroethylene liners so that the face is exposed to acid and rinse solutions pumped into the chamber formed by the interior of brackets 12 and 15. This two-cell apparatus was used for chlorosulfonation where it was desired that the reaction proceed from one side only until it had penetrated to a certain depth of the films thickness. It is apparent that a second styrenated polyethylene film may be positioned on the other side of the brackets 12 and 15. $CCl_4$ was pumped from a storage tank under a nitrogen atmosphere, through the two cells in series, until the reaction was to be started. At this point, the $CCl_4$ was quickly drained from the cells and at a recorded time a 56/44 (by volume) mixture of chlorsulfonic acid/carbon tetrachloride was pumped through each cell at room temperature (also under a nitrogen atmosphere). After 1-½ hours, at which point the chlorosulfonation had proceeded about 90-95% across the films thickness, the reaction mixture was quickly drained, the sheets rinsed rapidly with $CCl_4$, and then removed and placed in a 1N $H_2SO_4$ solution. The sheets were left in the hydrolyzing mixture at 55° C with mixing for 18 hours. The resistance of the sheets was determined with an A.C. conductivity bridge (1 kc) and found to be 18,000 ohm-$cm^2$ (1N $H_2SO_4$), indicating that a section of unfunctionalized polystyrenated polyethylene still exists. The sulfonic acid groups were then neutralized and converted to their potassium salt with a 0.1N KOH/5% KCl solution and the excess electrolyte leached out with distilled water. The sheets were now blotted dry with paper towels and placed in a vacuum oven over $P_2O_5$ at 40° C. Alternatively, the sheets may be stirred in carbon tetrachloride, overnight.

The remaining unfunctionalized styrene groups were thereafter chloromethylated by placing the partially reacted film into a mixture of chloromethyl methyl ether containing 2.5% (by weight) $SnCl_4$ and refluxing at 57° C. for 6 hours. The chloromethylene groups were then quaternized in a solution of 25% (by volume) trimethylamine in acetone for 18 hours at 25° C. prior to equilibrating in a 1N KF solution for 24 hours at room temperature. The final single film bipolar membrane had a potential drop across it of 1.07 at 109 ma/$cm^2$ (DC) when measured in an electrodialysis cell with 1N KOH and 1N HCl next to its anion and cation permeable sides, respectively. Its potential drop at zero current flow (Eo) was 0.81 volts, indicative of the fact that it is bipolar and functions as a water-splitter. In an electrodialysis cell with 8.7-9.1% HF and 9.4-11.0% KOH on opposite sides, at 163 ma/$cm^2$ (DC) it was found to have a base current efficiency of 74% and an acid current efficiency of 83% and KF in the acid at only 0.5%, i.e. $N_{SA}$ = 0.5%. This membrane was run continuously for 371 days as a water-splitter at 77-91 ma/$cm_2$ (DC) at 30° C. between 9% HF and 7% KOH with no loss in its performance characteristics and only a modest increase in its potential drop.

Microtomed cross-sections of the membrane had their cationic regions stained with methylene blue or their anionic region stained with methyl orange. In either case, microscopic examination of such sections clearly show the exact location of the interface and also its sharpness. Generally, the lower the potential drop of the membrane the closer the cationic permeable layer approaches the opposite face, up to about 95%; whereupon the film begins to lose some of its bipolarity (Eo falls below 0.78) and assumes more and more pure cationic character, e.g., Eo approaches zero.

EXAMPLE 23

A styrenation mixture consisting of 7.5 parts commercial divinyl benzene and 92.3 parts of freshly distilled styrene was heated in a beaker, with agitation to 80° C. Then 0.2 parts of benzoyl peroxide was added, as catalyst, and after mixing for 1 minute, the solution was poured into a 9 × 14 × 1 ¼ inch stainless steel trough, immersed in an 80° C constant temperature bath. Immediately thereupon, a 7 × 23 inch sheet of 9 mil high density polyethylene was folded in half and immersed in the sytrenating mixture, supported by two stainless steel rods. After impregnating the film for 35 minutes, it was removed from the trough, excess styrene squeegeed off its surface and then it was clamped securely between three aluminum foil covered, 8 × 12 × ⅛ inch glass plates. The ensemble was completely immersed in a saturated sodium sulfate salt solution at 80° C. for 18–22 hours to complete the polymerization. After removing, rinsing with distilled water for 3 hours at 45° C. and drying in a vacuum oven overnight at 40° C over $P_2O_5$, the film was found to contain 16.7 weight percent polystyrene. Excess polystyrene was removed with dichloroethane. The above described process was repeated on the same films yielding a product containing 33.5 percent polystyrene. This higher polystyrene content was required due to the higher divinyl benzene content if one wishes to maintain a low voltage drop across the final membrane.

After swelling the polystyrenated sheet 24 hours in $CCl_4$, and removing free polystyrene from its surface, 7 × 11 inch sections were mounted in the chlorosulfonation apparatus described in Example 22. Chlorosulfonation was conducted with a 65/35 (by volume) chlorosulfonic acid/carbon tetrachloride mixture from one side only for 210 minutes at 25° C. After rinsing with $CCl_4$ and hydrolyzing at 40° C. in 1N $H_2SO_4$ for two days, the partially functionalized sheet was found to have a resistance of 8,600 ohm-$cm^2$ in 1N $H_2SO_4$ (A.C. conductivity bridge, 1 kc) indicating that part of the sheet remained unfunctionalized. The sulfonic acid groups were neutralized and converted to their potassium salt with 0.1N KOH/5%KCl solution and the excess electrolyte leached out with distilled water. The sheets were blotted dry with paper towels and placed in a vacuum oven over $P_2O_5$ at 40° C.

The remaining unfunctionalized styrene groups were thereafter chloromethylated by placing the film into a mixture of chloromethyl methyl ethere containing 2.5% (by weight) $SnCl_4$ and refluxing (57° C) for six hours. Next, the chloromethylene groups were quaternized in a solution of 25% (by volume) trimethylamine in acetone for 18 hours at 25° C. prior to equilibrating in a 1N KF solution for 2 days at room temperature. The final single film bipolar membrane was found to have a potential drop of 1.04 volts at 109 ma/$cm^2$ when mounted between 1N KOH and 1N HCl in an electrodialysis cell. At no current flow its potential drop was 0.78 (Eo). In addition, it was found to perform as a watersplitter at an acid current efficiency of 78.9% and a base current efficiency of 66% when mounted between 5.0% KOH and 5.4% HF and at a current of 163 ma/cm$^2$. The membrane produced salt (KF) in the acid (HF) solution at a current efficiency of only 0.48%, i.e. $N_{SA} = 0.48\%$.

EXAMPLE 24

A styrenation mixture consisting of 15 parts of commercial divinyl benzene and 84.5 parts of freshly distilled styrene was heated in a beaker with agitation to 90° C. To this mixture was then added 0.5 parts of benzoyl peroxide as catalyst, and after mixing for one-half minute, the solution was poured into 9 × 14 × 1-¼ inch stainless steel trough, immersed in a 90° C constant temperature bath. Immediately thereupon a 7 × 23 inch sheet of 9 mil high density polyethylene film, folded in half, was immersed in the styrenating mixture and supported by two stainless steel rods. After impregnating the film for 17 minutes it was removed, squeegeed free of excess surface styrene and clamped tightly between three aluminum foil covered 8 × 12 × ⅛ inch glass plates. The entire ensemble was quickly immersed in a saturated sodium sulfate salt solution at 75° C and left for 20 hours to complete the polymerization. After removing, rinsing with distilled water for 3 hours at 45° C and drying overnight in a vacuum oven over $P_2O_5$ at 40° C, the film was found to contain 16.3% (by weight) polystyrene. The above described process was repeated on the same film yielding a product with contained 38.1% polystyrene.

After swelling the sheet 24 hours in carbon tetrachloride and removing excess free polystyrene from its surface, 7 × 11 inch sections were mounted in the chlorosulfonation apparatus described in Example 22. Chlorosulfonation was conducted with a 56/44 (by volume) chlorosulfonic acid/carbon tetrachloride mixture from one side only for 180 minutes at 25° C. After rinsing with $CCl_4$ and hydrolyzing at 55° C. in 1N $H_2SO_4$ for two days the partially functionalized sheet was determined to have a resistance (A.C. conductivity bridge, 1 kc) of 4,700 ohm-cm$^2$ in 1N $H_2SO_4$, indicating that part of the sheet still remains unfunctionalized. The sulfonic acid groups were neutralized and converted to their potassium salt with a 0.1N KOH/5%KCl solution and the excess electrolyte leached out with distilled water. The sheets were blotted dry with paper towels and placed in a vacuum oven over $P_2O_5$ at 40° C overnight.

The remaining unfunctionalized styrene groups were now chloromethylated by placing the film into a mixture of chloromethyl methyl ether containing 2.5% (by weight) $SnCl_4$ and refluxing at 57° C for 6 hours. The chloromethylene groups were then quaternized in a solution of 25% (by volume) trimethylamine in acetone for 18 hours at 25° C prior to equilibrating in a 1N KF solution for two days at room temperature. The final single film bipolar membrane was found to have a potential drop of 0.84 volts at 91 ma/cm$^2$ with 1N KOH and 1N HCl adjacent to its anion and cation permeable sides, respectively. At no current flow its potential drop was 0.78 (Eo). It performed with a base current efficiency of 74% and an acid current efficiency of 92% when tested in an electrodialysis cell at 163 ma/cm$^2$, between 9.1–9.5% HF and 9.8–11.3% KOH, and $N_{SA} = 1.6\%$. In addition, it was used in continuous operation as a water-splitter in an electrodialysis cell for 126 days at 47° C and 91 ma/cm$^2$ while mounted between 1% NaOH and 0.8N HCl.

Microscopic examination of stained thin cross-sections of similar membranes (40% polystyrene) show that chlorosulfonation for 150 minutes yields a single film bipolar membrane which is 67% cationic and has a potential drop of 0.97 volts at a current density of 163 ma/cm$^2$ (Eo = 0.78 volts). Chlorosulfonation for 210 minutes yields films with a resistance of 9.3 ohm-cm$^2$ (1N $H_2SO_4$) and which are 97% cationic and yield subsequent bipolar membranes with Eo = 0.70 volts, indicating it has lost some of its bipolarity.

EXAMPLE 25

A styrenation mixture consisting of 15 parts commercial divinyl benzene and 84.5 parts of freshly distilled styrene was heated in a beaker with agitation at 80° C. Then 0.5 parts of benzoyl peroxide as catalyst was added and after mixing for 1 minute, the solution was poured into a 9 × 14 × 1–174 inch stainless steel trough immersed in an 80° C constant temperature bath. Immediately thereupon, a 7 × 23 inch sheet of 10 mil ultra high molecular weight polyethylene was immersed in the styrenating mixture and supported by stainless steel rods. After impregnating the film for 25 minutes, it was removed from the trough, excess styrene squeegeed from its surface and then it was clamped securely between three aluminum foil covered, 8 × 12 × ⅛ inch glass plates. The ensemble was completely immersed in a saturated sodium sulfate salt bath at 70° C for 18 hours to complete the polymerization. After removing, rinsing with distilled water for 3 hours at 45° C and drying in a vacuum oven overnight at 40° C over $P_2O_5$, the film was found to contain 25 weight percent polystyrene. After swelling the polystyrenated sheet 24 hours in $CCl_4$, and removing any free polystyrene from its surface, 7 × 11 inches sections were mounted in the chlorosulfonation apparatus described in Example 22. Chlorosulfonation was conducted with 56/44 (by volume) chlorosulfonic acid/carbon tetrachloride mixture from one side only for 210 minutes at 25° C. After a quick $CCl_4$ rinse, the film were hydrolyzed in 1N $H_2SO_4$ for two days at 60° C. The resistance of the partially functionalized sheet was measured with an A.C. conductivity bridge at 1 kc and found to be 17,700 ohm-cm$^2$ in 1 N $H_2SO_4$. The sulfonic acid groups were then neutralized and converted to the potassium salt with 0.1N KOH/5%HCl solution. After leaching out excess electrolyte with distilled water, the sheets were blotted dry with paper towels and placed in a vacuum oven at 40° C over $P_2O_5$ overnight.

The remaining, unfunctionalized styrene groups were now chloromethylated by placing the film into a solution of chloromethyl methyl ether containing 2.5% (by weight) $SnCl_4$ and refluxing at 57° C for 6 hours. The chloromethylene groups so formed were then quaternized by reacting in a solution of 25% trimethylamine in acetone at 30° C for 24 hours prior to equilibration for 48 hours in 1N KF. The final single film bipolar membrane was found to have a potential drop of 1.14 volts at 91 ma/cm$^2$ (DC) when used between 1N KOH and 1N HCl solution. At zero current it had a potential drop (Eo) of 0.79 volts. In an electrodialysis cell between 9.5–10.0% HF and 9.9–11.5% KOH at a current density of 163 ma/cm$^2$ it was found to perform as a water-splitter with a base current efficiency of 72% and an acid current efficiency of 83% and no KF salt was found in the HF. In addition, the membrane was operated as a water-splitter continuously for 380 days at 47° C and 91 ma/cm² when kept between 9% HF and 7% KOH solutions. Its performance was then remeasured and found to be unchanged, i.e. 74.6% base current efficiency and 84.9% acid current efficiency.

EXAMPLE 26

A styrenation mixture consisting of 15 parts commercial divinyl benzene and 84.5 parts of freshly distilled styrene was heated in a beaker, with agitation to 80° C. Then 0.5 parts of benzoyl peroxide as catalyst was added and after mixing for 1 minute, the solution was poured into a 9 × 14 × 1-¼ inches stainless steel trough, immersed in an 80° C constant temperature bath. Immediately thereafter, a 7 × 23 inches sheet of 10 mil ultra-high molecular weight polyethylene was folded in half and immersed in the styrenating mixture, supported by two stainless steel rods. After impregnating the film for 30 minutes, it was removed from the trough, excess styrene squeegeed off its surface and then it was clamped securely between three aluminum foil covered, 8 × 12 × ⅛ inch glass plates. The ensemble was completely immersed in a saturated sodium sulfate salt solution at 75° C for 20 hours to complete the polymerization. The film was removed, rinsed with distilled water for 3 hours at 45° C and dried overnight in a vacuum oven at 40° C over $P_2O_5$. It was found to contain 18.0% polystyrene and the above described process was repeated once more yielding a sheet containing 36.8 percent polystyrene.

After swelling the polystyrenated sheet overnight in $CCl_4$, and removing free polystyrene from its surface, 7 × 11 inches sections were mounted in the chlorosulfonation apparatus described in Example 22. Chlorosulfonation was conducted with a 56/44 (by volume) chlorosulfonic acid/carbon tetrachloride mixture from 1 side only for 330 minutes at 30° C. After rinsing with $CCl_4$ and hydrolyzing at 40° C in 1N $H_2SO_4$ for 2 days, the partially functionalized sheet was determined to have a resistance of 48 ohm-cm² in 1N $H_2SO_4$. Microscopic examination of a stained thin section indicated that 94% of the film was cationic. The sulfonic acid groups were neutralized and converted to their potassium salt with a 0.1N KOH/5%KCl solution and the excess electrolyte leached out with distilled water. The sheets were blotted dry with paper towels and placed in a vacuum oven overnight at 40° C over $P_2O_5$.

The remaining unfunctionalized styrene groups were now chloromethylated by placing the film into a mixture of chloromethyl methyl ether containing 2.5% (by weight) $SnCl_4$ and refluxing at 57° C for 6 hours. The chloromethylene groups were then quaternized in a solution of 25% (by volume) trimethylamine in acetone for 24 hours at 30° C prior to equilibrating in a 1N KF solution for 2 days at room temperature. The final single film bipolar membrane was found to have a potential drop of 0.86 volts at 109 ma/cm² (D.C.) when placed between a 1N KOH and 1N HCl solution. At no current flow the potential drop across it was found to be 0.79 volts (Eo). In an electrodialysis cell between 9.1–9.5% HF and 9.8–11.4% KOH it performed as a water-splitter with a base current efficiency of 76% and an acid current efficiency of 87% at a current density of 163 ma/cm², and $N_{SA} = 0.1\%$.

Specimens of the same initial styrenated polyethylene sheets which were chlorosulfonated from one side only from 270–300 minutes yielded subsequent single film bipolar membranes which were determined to be 81% cationic and had potential drops of 1.03 volts at 109 ma/cm² and an Eo = 0.79 volts. Evidently, the greater the polystyrene content of the membrane not only is its potential drop lower but it is also less sensitive to its degree of cationic character. Specimens chlorosulfonated for shorter time periods (210–240 minutes) had smaller cationic regions (64–66%) and slightly higher potential drops (1.25–1.43 volts at 109 ma/cm².

EXAMPLE 27

A styrenation mixture consisting of 15 parts commercial divinyl benzene and 84.5 parts of freshly distilled styrene was heated in a beaker, with agitation, to 85° C. Then 0.5 parts of benzoyl peroxide was added, as catalyst, and after mixing for one-half minute the solution was poured into a 9 × 14 × 1-¼ inches stainless steel trough, immersed in a 85° C constant temperature bath. A 7 × 23 inches sheet of 10 mil ultra-high molecular weight polyethylene was folded in half and immersed in te styrenating mixture supported on two stainless steel rods. After impregnating the film for 30 minutes, it was removed from the trough, excess styrene squeegeed off its surface and then it was clamped securely between three aluminum foil covered, 8 × 12 × ⅛ inch glass plates. The entire assembly was then completely immersed in a saturated sodium sulfate salt solution at 75° C for 20 hours to complete the polymerization. After removing, rinsing with distilled water for 3 hours at 45° C and drying in a vacuum oven overnight at 40° C over $P_2O_5$, the film was found to contain 22.8% polystyrene. The above described process was repeated once more on the same styrenated sheet yielding a final sheet containing 45.9% polystyrene.

After swelling the polystyrenated sheet for 24 hours in $CCl_4$, and removing any free surface polystyrene, 7 × 11 inches sections were cut out and mounted in the chlorosulfonation apparatus described in Example 22. Chlorosulfonation was conducted with a 56/44 (by volume) chlorosulfonic acid/carbon tetrachloride mixture from one side only for 270 minutes at 25° C. After rinsing with $CCl_4$ and hydrolyzing at 55° C for 48 hours, the partially functionalized sheet was determined to have a resistance of 1,000 ohm-cm² (A.C. conductivity bridge, 1 kc) in 1N $H_2SO_4$. The sulfonic acid groups were then neutralized and converted to their potassium salt with a 0.1N KOH/5% KCl solution and the excess electrolyte was leached out with distilled water. The sheets were blotted dry with paper towels and placed in a vacuum oven over $P_2O_5$ at 40° C overnight.

The remaining unfunctionalized styrene groups were now chloromethylated by placing the film into a mixture of chloromethyl methyl ether containing 2.5% (by weight) $SnCl_4$ and refluxing at 57° C for 6 hours. The chloromethylene groups were then quaternized in a solution of 25% (by volume) trimethylamine in acetone for 18 hours at 25° C prior to equilibrating in a 1N KF solution for two days at room temperature. The final single film bipolar membrane was found to have a potential drop of 0.80 volts at 91 ma/cm² (D.C.) when mounted between 1N KOH and 1N HCl in an electrodialysis cell. At no current flow, it had a voltage drop of 0.79 volts. It performed as a water-splitter between 9.3–9.7% HF and 9.7–11.5% KOH at 163 ma/cm² with a base current efficiency of 73% and an acid current efficiency of 86% and no KF was found in the acid, i.e., $N_{SA} = O$. In addition, it was run continuously for 167 days in an electrodialysis cell at 47° C and 91 ma/cm² while mounted between 9% HF and 9% KOH without any loss in its performance efficiencies.

Samples from the same initial styrenated polyethylene film were chlorosulfonated as described above for times ranging from 210 to 300 minutes and yielded subsequent single film bipolar membranes with potential drops of about 0.80 volts at 109 ma/cm².

EXAMPLE 28

A styrenation mixture consisting of 7.5 parts of commercial divinyl benzene and 92.3 parts of freshly distilled styrene was heated in a beaker, with agitation, to 85° C. Then 0.2 parts of benzoyl peroxide was added, as catalyst, and after mixing for 1 minutes the solution was poured into a 9 × 14 × 1-¼ inches stainless steel trough, immersed in an 85° C constant temperature bath. Immediately thereafter, a 7 × 23 inches sheet of 10 mil ultra-high molecular weight polyethylene film, supported by two stainless steel rods, was immersed into the styrenated mixture. After impregnating the film for 30 minutes, it was removed from the trough, excess styrene squeegeed from its surface, and then it was clamped securely between three aluminum foil covered, 8 × 12 × ⅛ inch glass plates. The entire assembly was completely immersed in a saturated sodium sulfate salt solution at 85° C for 20 hours to complete the polymerization. After removing, rinsing with distilled water for 3 hours at 45° C, and drying in a vacuum oven overnight at 40° C over $P_2O_5$, the film was found to contain 19.6% polystyrene. The above process was once more repeated on the same styrenated sheet and yielded a final product containing 43.3% polystyrene.

After swelling the polystyrenated sheet 24 hours in $CCl_4$, and removing the free polystyrene from its surface, 7 × 11 inches sections were cut out and mounted in the chlorosulfonation apparatus described in Example 22. Chlorosulfonation was conducted with a 65/35 (by volume) chlorosulfonic acid/carbon tetrachloride mixture from one side only for 280 minutes at 25° C. After rinsing with $CCl_4$ and hydrolyzing at 55° C in 1N $H_2SO_4$ for two days, the partially functionalized sheet was determined to have a resistance of 4,800 ohm-cm² in 1N $H_2SO_4$ (A.C. conductivity bridge, 1 kc). The sulfonic acid groups were then neutralized and converted to their potassium salt with a 0.1N KOH/5% KCl solution and the excess electrolyte leached out with distilled water. The sheets were blotted dry with paper towels and placed in a vacuum oven over $P_2O_5$ at 40° C overnight.

The remaining unfunctionalized styrene groups were now chloromethylated by placing the film into a mixture of chloromethyl methyl ether containing 2.5% (by weight) $SnCl_4$ and refluxing at 57° C for 6 hours. The chloromethylene groups were then quaternized in a solution of 25% (by volume) trimethylamine in acetone for 18 hours at 30° C prior to equilibrating in a 1N KF solution for 2 days at room temperature. The final single film bipolar membrane was found to have a potential drop of 0.90 volts at 109 ma/cm² (DC) when mounted between 1N KOH and 1N HCl. At no current flow its potential drop was 0.78 volts (Eo). It performed as a water-splitter between 5.1% HF and 5.4% KOH at 163 ma/cm² with a base current efficiency of 82% and an acid current efficiency greater than 90% and $N_{SA}$ = 0.34%.

Sections of the same initial styrenated polyethylene film were chlorosulfonated as described above for times ranging from 220 to 320 minutes. The single film bipolar membranes subsequently obtained had potential drops ranging from 1.03 to 0.86 volts at a current density of 109 ma/cm². Microscopic examination of stained, thin cross-sections of these same bipolar membranes show the cationic regions range from 54–79%.

The bipolar membranes of the invention will find a variety of advantageous applications as will be apparent to those skilled in the art. A typical application is that illustrated by the cell 1 of FIG. 1 wherein a bipolar membrane 2 is employed between two inner components 5 and 6 of a four compartment unit formed in conjunction with conventional anion and cation permeable membranes 3 and 4, respectively. The unit includes outer compartment 7 and 8 and is provided with a cathode 9 and anode 10.

TABLE II

PERFORMANCE DATA FOR SINGLE FILM BIPOLAR MEMBRANES

| Example No. | Initial Film | % Polystyrene | % Divinyl benzene[1] | Voltage Drop $E_o$ | Voltage Drop $E_m$ | $i_d$ (ma/cm²) | %HF | %KOH | %$N_B$ | %$N_A$ | %$N_{SA}$ |
|---|---|---|---|---|---|---|---|---|---|---|---|
| 22 | 8.6 mil HDPE | 23 | 2 | 0.81 | 1.07v at 109 ma/cm² | 109 | 9.5–9.8 | 3.7–5.3 | 80 | 82.6 | 0.98 |
|  |  |  |  |  |  | 163 | 8.7–9.1 | 9.4–11.0 | 74 | 83 | 0.5 |
| 23 | 8.6 mil HDPE | 33.5 | 7.5 | 0.78 | 1.04v at 109 ma/cm² | 109 | — | — | — | — | — |
|  |  |  |  |  |  | 163 | 5.4 | 5 | 66 | 78.9 | 0.48 |
| 24 | 8.6 mil HDPE | 38.1 | 15 | 0.78 | 0.84v at 91 ma/cm² | 109 | — | — | — | — | — |
|  |  |  |  |  |  | 163 | 9.1–9.5 | 9.8–11.3 | 74 | 92 | 1.6 |
| 25 | 10 mil UHMW-PE | 25.1 | 15 | 0.79 | 1.14v at 91 ma/cm² | 109 | 10.1–10.3 | 4.3–5.7 | 78 | 77 | 0.4 |
|  |  |  |  |  |  | 163 | 9.5–10.0 | 9.9–11.5 | 72 | 83 | — |
| 26 | 10 mil UHMW-PE | 36 | 15 | 0.79 | 0.86v at 109 ma/cm² | 109 | — | — | — | — | — |
|  |  |  |  |  |  | 163 | 9.1–9.5 | 9.8–11.4 | 76 | 87 | 0.1 |
| 27 | 10 mil UHMW-PE | 45.9 | 15 | 0.79 | 0.80v at 91 ma/cm² | 109 | ~10 | 7.5–8.5 | 68 | (74) | — |
|  |  |  |  |  |  | 163 | 9.3–9.7 | 9.7–11.5 | 73 | 86 |  |
| 28 | 10 mil UHMW-PE | 43.3 | 7.5 | 0.78 | 0.90v at 109 ma/cm² | 109 | — | — | — | — | — |
|  |  |  |  |  |  | 163 | 5.1 | 5.4 | 82 | >90 | 0.34 |

[1]Weight percent commercial 55% divinylbenzene in the styrenation mixture.
[2]%$N_B$ = current efficiency for the production of base, KOH.
[3]%$N_A$ = current efficiency for the production of acid, HF.
[4]%$N_{SA}$ = current efficiency for the production of salt, KF, in acid, HF.

Employing the procedure of Example 22 the bipolar membranes of Examples 29 to 31 were prepared, the data therefor is set forth in TABLE III.

TABLE III

| Ex. No. | Film | Styrenation | Polymerization | Chlorosulfonation | Chloromethylation Em and Quaternization | |
|---|---|---|---|---|---|---|
| 29 | 8 Mil Polypropylene | 89.5% styrene 10% Divinyl- benzene 0.5% Benzoyl- peroxide 20 min. at 85° C | 18 Hrs. at 75° C 2 stages to 41% polystyrene | 150 min. at 25° C 65/35:ClSO$_3$H/ CCl$_4$ | 6 Hrs. at 58° C chloro-methyl- methyl ether 2.5% SnCl$_4$ 20 Hrs. at 25° C. 25/75: trimethyl- amine/acetone | (109 ma/cm$^2$) 0.92 volt |
| 30 | 9 Mil polyethylene polypropylene co-polymer | 94.5% 2-chloro- styrene 5% divinyl toluene 0.5% Benzoyl- peroxide 30 min. at 85° C. | 18 Hrs. at 75° C. 25% poly-2- chloro-styrene | 180 min at 25° C. 65/35:ClSO$_3$H/ CCl$_4$ | '' | 1.10 volt |
| 31 | 8 Mil poly- chlorotri- fluoro ethylene | 92% 2-chloro- styrene 7.5% α,α'-di- methyl divinyl benzene 0.5% Benzoyl- peroxide 25 min. at 80° C | 18 Hrs. at 25° C 2 stages to 36% polystyrene | 180 min. at 75° C. 65/35:ClSO$_3$H/ CCl$_4$ | '' | 1.05 volt |

We claim:

1. A single film bipolar polymeric membrane, having an ion selectivity above 80% in an electrolyte medium of at least 0.1 molar, derived from monomers selected from the group consisting of

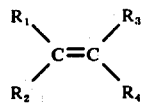 and 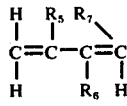

(I)  (II)

wherein $R_1$ to $R_7$ are substituents selected from the group consisting of hydrogen, chlorine, fluorine, alkyl radicals of 1 to 5 carbon atoms and phenyl radicals and copolymers thereof, and chlorinated and fluorinated polymers and copolymers thereof containing intimately dispersed therein at least 15 percent by weight based on the total weight of membrane, of a polymer providing aromatic nuclei and comprised of monomer units of the formula

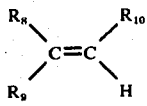 (III)

wherein $R_8$, $R_9$ and $R_{10}$ are substituents selected from the group consisting of hydrogen, alkyl radicals of 1 to 4 carbon atoms, phenyl substituted alkyl radicals of 2–4 carbon atoms, phenyl, phenoxy-, thiophenoxy, and naphthyl radicals and the hydroxyl-, alkoxyl-, and halo- substituted phenyl, phenoxy, thiophenoxy, and naph- thyl radicals, and wherein at least one substituent of (III) is an aromatic radical, said membrane being cross- linked to a degree equivalent to that obtained by a 2 to 20 weight percent mixture of a commercial 55 percent divinyl benzene in styrene, and wherein about 50–98 percent of the membranes cross-section has highly dissociable cation exchange groups chemically bonded to the aromatic nuclei from one side only and having from about 2–50%, highly dissociable anionic exchange groups chemically bonded to the aromatic nuclei on the opposite side of said film.

2. The single film membrane of claim 1 wherein the monomer is ethylene.

3. The single film membrane of claim 1 wherein the polymer providing aromatic nuclei is polystyrene.

4. The single film membrane of claim 1 wherein the cross-linking is effected with divinylbenzene.

5. The single film membrane of claim 1 wherein the highly dissociable cation exchange groups are sulfonic acid groups.

6. The single film membrane of claim 1 wherein the highly dissociable amonic exchange groups are quater- nary trimethylamine groups.

7. A single film bipolar membrane having an ion selectivity above 80% in an electrolyte medium of at least 0.1 molar, derived from a polyethylene film con- taining intimately dispersed therein from 15 to about 70%, by weight based on the weight of the membrane of polystyrene, which provides aromatic nuclei and which is cross-linked to a degree equivalent to that obtained by a cross-linking with from about 2–20 weight percent mixture of a 55 percent divinyl benzene in styrene; wherein about 50 percent to about 98 per- cent of the membranes thickness has highly dissociable cation exchange groups chemically bonded to the aro- matic nuclei from one side only, and containing from about 2–50% highly dissociable anionic exchange groups chemically bonded to the aromatic nuclei on the opposite side of said film.

8. A single film bipolar membrane having an ion selectivity above 80% in an electrolyte medium of at least 0.1 molar, derived from a polypropylene film containing intimately dispersed therein from 15 to about 70%, by weight based on the weight of the mem- brane of polystyrene which provides aromatic nuclei and which is cross-linked to a degree equivalent to that obtained by cross-linking with from about 2–20 weight percent mixture of a 55 percent divinyl benzene in styrene; wherein about 50 percent to about 98 percent of the membranes thickness has highly dissociable cat- ion exchange chemically bonded to the aromatic nuclei from one side only, and containing from about 2–50% highly dissociable anionic exchange groups chemically bonded to the aromatic nuclei on the opposite side of said film.

9. A single film bipolar membrane having an ion selectivity above 80% in an electrolyte medium of at least 0.1 molar, derived from a film comprising a copolymer of ethylene and propylene and containing intimately dispersed therein from about 15 to about 70%, by weight, based on the weight of the membrane of polystyrene, which provides aromatic nuclei and which is cross-linked to a degree equivalent to that obtained by cross-linking with from about 2 to 20 percent mixture of a 55 percent divinyl benzene in styrene; wherein about 50 percent to about 98 percent of the membranes thickness has highly dissociable cation exchange groups chemically bonded to the aromtic nuclei from one side only, and containing from about 2–50% highly dissociable anionic exchange groups chemically bonded to the aromatic nuclei on the opposite side of said film.

10. A single film bipolar membrane having an ion selectivity above 80% in an electrolyte medium of at least 0.1 molar, derived from a film of polytrifluorochloroethylene containing intimately dispersed therein from 15 to about 70%, by weight, based on the weight of the membrane, of polystyrene which provides aromatic nuclei and which is cross-linked to a degree equivalent to that obtained by cross-linking with from about 2 to 20 weight percent mixture of a 55 percent divinyl benzene in a styrene; wherein about 50 percent to about 98 percent of the membranes thickness has highly dissociable cation exchange groups chemically bonded to the aromatic nuclei from one side only, and containing from about 2–50% highly dissociable anionic exchange groups chemically bonded to the aromatic nuclei on the opposite side of said film.

11. A single film bipolar membrane having an ion selectivity above 80% in an electrolyte medium of at least 0.1 molar, derived from a polyethylene film containing intimately dispersed therein from 15 to about 70%, by weight based on the weight of the membrane of polystyrene which provides aromatic nuclei and which is cross-linked to a degree equivalent to that obtained by cross-linking with from about 2 to 20 weight percent mixture of a 55 percent divinyl benzene in styrene; wherein about 50 percent to about 98 percent of the membranes thickness has highly dissociable sulfonic acid cationic exchange groups chemically bonded to the aromatic nuclei from one side only and containing from about 2–50 percent highly dissociable quarternized trimethylamine anionic exchange groups chemically bonded to the aromatic nuclei on the opposite side of said film.

* * * * *